United States Patent [19]

Yamanaka

[11] 4,369,935
[45] Jan. 25, 1983

[54] TAPE CASSETTE AND TAPE TRANSPORT MECHANISM

[75] Inventor: Takeshi Yamanaka, Otsu, Japan

[73] Assignee: Omron Tateisi Electronics Co., Kyoto, Japan

[21] Appl. No.: 217,609

[22] Filed: Dec. 18, 1980

[30] Foreign Application Priority Data

Dec. 21, 1979 [JP] Japan ................................. 54-167008
Dec. 21, 1979 [JP] Japan ................................. 54-167009

[51] Int. Cl.³ ......................... G03B 1/04; G11B 15/32
[52] U.S. Cl. ..................................... 242/192; 242/200
[58] Field of Search .................... 242/192, 197–204; 360/71, 73, 74

[56] References Cited

U.S. PATENT DOCUMENTS

4,225,099 9/1980 Schoettle et al. ................... 242/192
4,262,859 4/1981 Yamanaka ........................... 242/192

Primary Examiner—Leonard D. Christian
Attorney, Agent, or Firm—Sughrue, Mion, Zinn, Macpeak & Seas

[57] ABSTRACT

A tape cassette comprises pivotally supported first and second carriages having respective hubs rotatably carried thereby and wrapped with magnetic recording tape to form rolls of tape, a biasing spring for biasing the first and second carriages in a direction close towards each other, and a drive wheel rotatably supported inside the cassette and having a coupling disc adapted to receive a rotational force necessary to rotate the drive wheel. The rolls of tape on the respective hubs are, by the action of the biasing spring, forced to contact the drive wheel from opposite directions. In order to create a difference between the pressure of contact of one roll to the drive wheel and that of the other roll to the drive wheel when the tape cassette is in use, a friction element is provided for each of the carriages to impart a resistance to the corresponding carriage in a direction counter to the direction of pivotal movement of the corresponding carriage. A tape transport mechanism necessary to generate the rotational force is also disclosed.

5 Claims, 11 Drawing Figures

TAPE CASSETTE AND TAPE TRANSPORT MECHANISM

BACKGROUND OF THE INVENTION

The present invention relates to a tape cassette containing a length of magnetic recording tape suited particularly, but not exclusively, for use in a small-size portable video tape recorder for recording and/or reproducing video information. The present invention also relates to a tape transport mechanism cooperative with the tape cassette of a type referred to above and herein provided.

There is known a system wherein the capstan operatively coupled to a drive motor is forced to contact the outer peripheral surfaces of respective supply and take-up rolls of magnetic recording tape with a contact pressure between the capstan and the take-up roll being greater than that between the capstan and the supply roll to hold the magnetic recording tape under tension, so that the magnetic recording tape can be transported from the supply roll onto the take-up roll during rotation of the capstan. By utilizing this system, one can design and construct a video tape recorder.

In the known system described above, in order to generate a greater contact pressure between the capstan and the take-up roll than that provided between the capstan and the supply roll, means for generating a pressure differential is employed. The pressure differential generating means has heretofore made use of a brake band, a torque motor or a spring element. However, it has been found that the use of any one of the brake band, the torque motor and the spring element for the pressure differential generating means renders the mechanism complicated and, at the same time, requires a relatively large space for installation, thereby imposing a limitation on design and manufacture of the device as small and as compact as possible.

In view of the above, it has long been considered difficult to design and manufacture a tape cassette containing therein a pair of supply and take-up rolls of magnetic recording tape, and what has long been done is to employ a cartridge system wherein the cartridge contains only one roll of magnetic recording tape, the free end of which tape is secured to a take-up hub, built in a drive mechanism together with the capstan, by means of a length of leader tape so that, during rotation of the take-up hub together with the capstan, the magnetic recording tape can be unwound from the roll and taken up by the take-up hub.

The known cartridge system involves several disadvantages. By way of examples, when the magnetic recording tape is completely unwound from the roll, the trailing end portion of the magnetic recording tape being unwound and taken up by the take-up hub tends to become loose to such an extent that the edge of the magnetic recording tape is damaged. Accordingly, the cartridge system cannot advantageously be used in association with a small-size, portable video camera.

In any event, U.S. Pat. No. 3,526,371, patented Sept. 1, 1970, to James W. F. Blackie et al, discloses a cartridge containing spaced apart rolls of magnetic recording tape which are supported respectively by pivotable carriages within the cartridge, and a tire-lined idler roller positioned substantially intermediate between the rolls of magnetic recording tape, said carriages being biased by a biasing spring so as to pivot in a direction close towards each other with the outer perimeters of the respective rolls of magnetic recording tape held in contact with the idler roller. This U.S. patent also discloses a tape transport mechanism provided independently of the cartridge and including a motorcoupled capstan which, when the cartridge is mounted on a tape transport deck or cartridge holder, is drivingly coupled to the tire-lined idler roller with the magnetic recording tape sandwiched therebetween so that the tape can be drawn from one roll to the other during rotation of the capstan.

The pressure differential generating means employed in the above mentioned U.S. patent is provided on the side of the tape transport mechanism, particularly on the tape transport deck, and comprises a spring-biased plunger which, when and after the cartridge has been mounted on the tape transport deck, protrudes into the cartridge and urges one of the tape rolls, which then serves as a take-up roll, towards the idler roller so that the outer perimeter of the take-up roll can be pressed against the idler roller with a greater force than that provided between the supply roll and the idler roller.

The cartridge and the tape transport mechanism disclosed in the above mentioned U.S. patent involve several disadvantages. By way of example, since the spring-biased plunger must protrude into the cartridge when and so long as the cartridge is mounted on the tape transport deck, not only is skill required to achieve a correct mounting of the cartridge on the tape transport deck, but also the removal of the cartridge from the tape transport deck cannot be done easily and smoothly without difficulty.

In addition, the pressure differential generating means employed in the above mentioned U.S. patent is, though it is in the form of the spring-biased plunger, complicated in construction and bulky in size and requires a relatively large space for installation.

SUMMARY OF THE INVENTION

Accordingly, the present invention has been developed with a view to substantially eliminating the disadvantages and inconveniences inherent in the prior art systems and has for its essential object to provide a tape cassette which is simple in construction and inexpensive in manufacturing cost.

Another important object of the present invention is to provide a tape cassette of the type referred to above, wherein a simple and inexpensive friction element is employed for the pressure differential generating means.

A further object of the present invention is to provide a tape cassette of the type referred to above, wherein a capstan is incorporated to ensure a steady and smooth running of a magnetic recording tape from one roll to the other.

It is a related object of the present invention to provide an improved tape transport mechanism operable particularly with the cassette of the type referred to above.

According to the present invention, the cassette comprises means defining a wall of the cassette and having an operating zone on one side of the wall, first and second carriages supported by the wall for pivotal movement in said operating zone, hubs rotatably carried by the first and second carriages and wrapped with magnetic recording tape to form rolls carried by the carriages, a capstan rotatably supported by the wall and including a coupling means adapted to be operatively coupled to an electric drive motor a frictional element for each of the carriages and operable to impart a resistance to the corresponding carriage in a direction counter to the direction of pivotal movement of the corresponding carriage, and a biasing element urging the carriages in directions towards each other thereby causing the outer perimeters of the respective rolls of magnetic recording tape to contact the capstan.

The tape transport mechanism operable with the cassette of the construction described above includes a coupling means in mating relation with the coupling means fast with the capstan such that, when and after the cassette has been loaded into a cassette holder, the coupling means in the cassette and the coupling means in the tape transport mechanism are operatively coupled to provide a drive transmission system between an electric motor and the capstan.

BRIEF DESCRIPTION OF THE DRAWINGS

These and other objects and features of the present invention will become clear from the subsequent description taken in conjunction with preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring first to FIGS. 1 to 7, a tape cassette embodying the present invention is generally identified by TC. This tape cassette TC comprises a generally rectangular container C constituted by base and upper walls 10 and 11, a pair of opposite side walls 12 and 13 and a pair of opposite end walls 14 and 15, said container TC containing therein a pair of pivotable carriages 16 and 17 of identical construction which are positioned adjacent the end walls 14 and 15, respectively.

Figure 2:
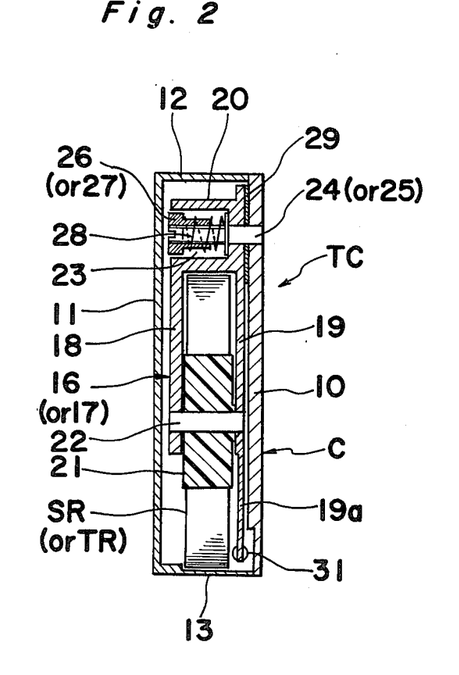
FIGS. 2 and 3 are cross sectional views taken along the lines II—II and III—III shown in FIG. 1, respectively.

Each of said carriages 16 and 17 is, as best shown in FIG. 2, of a generally U-shaped configuration constituted by a pair of arms 18 and 19 and a connecting post 20 having its opposite ends integral with the arms 18 and 19, said connecting post 20 extending at right angles to any one of the arms 18 and 19. Each of the carriages 16 and 17 has a hub 21 rotatably carried by the arms 18 and 19 of the associated carriage 16 or 17 at a position remote from the corresponding post 20 by means of a bearing shaft 22 journalled to the arms 18 and 19.

The connecting post 20 in each of the carriages 16 and 17 has, as best shown in FIG. 2, a blind hole 23 defined therein and extending at right angles to any one of the arms 18 and 19 and in parallel to the corresponding bearing shaft 22, through which blind hole 23 the corresponding carriage 16 or 17 is pivotally connected to the base wall 10 in a manner as will subsequently be described.

Figure 1:
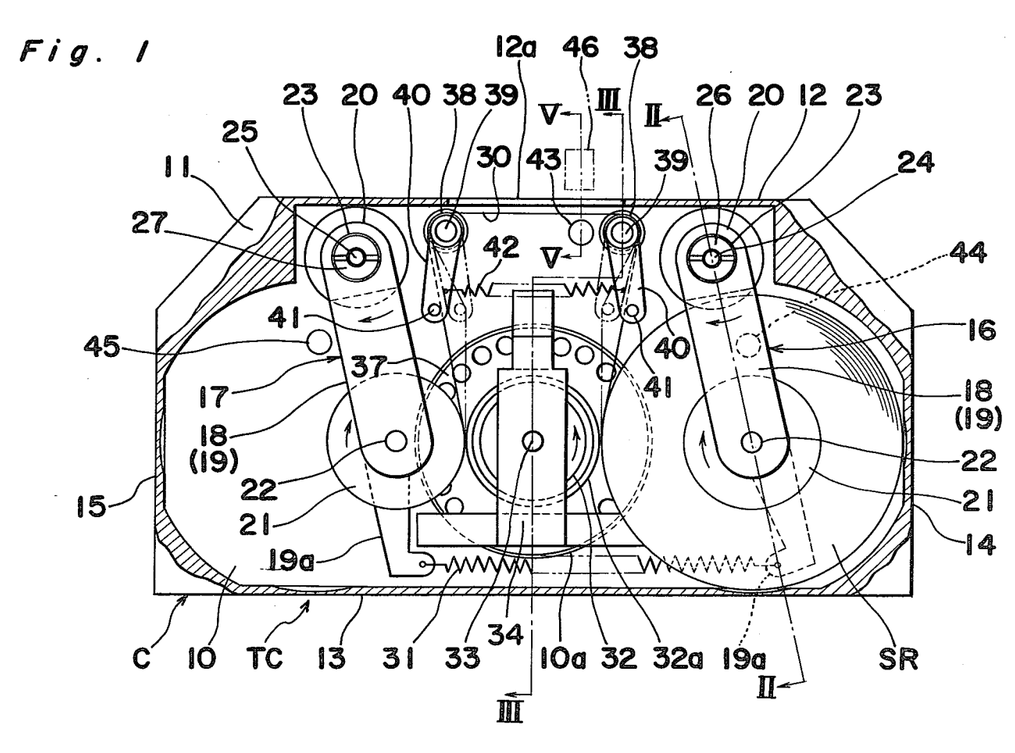
FIG. 1 is a top plan view of a cassette embodying the present invention with a top wall removed to show the details inside the cassette.

As best shown in FIGS. 1 and 2, the base wall 10 has a pair of spaced bearing pins 24 and 25 rigidly connected at one end to the base wall 10 and protruding into the interior of the container TC, the respective free end portions of said bearing pins 24 and 25 being threaded to receive corresponding nut members 26 and 27 in a manner as will be described later. The carriages 16 and 17 are pivotally mounted on the base wall 10 with the corresponding bearing pins 24 and 25 extending coaxially through the associated connecting posts 20 and protruding into the blind holes 23. The nut members 26 and 27 are in turn threadingly mounted on the free end portions of the respective bearing pins 24 and 25 while compression springs, generally identified by 28, are interposed between the nut members 26 and 27 and the bottoms of the blind holes 23. In the construction so far described, it will readily be understood that the carriages 16 and 17 are pivotable about the bearing pins 24 and 25 within the interior of the container TC, it being to be noted that, when the carriages 16 and 17 are so pivotally supported, the arms 18 and 19 of each of the carriages 16 and 17 extend in parallel relation to the upper and base walls 11 and 10, respectively.

For imparting an appreciable frictional resistance to the pivotal movement of each of the carriages 16 and 17 about the corresponding bearing pin 24 or 25 for the purpose which will become clear from the subsequent description, ring-shaped friction pieces generally identified by 29, preferably made of a frictional material of low frictional coefficient such as felt or polyfluoroethylene resin, are interposed between the carriages 16 and 17 and the base wall 10 and positioned around the bearing pins 24 and 25, respectively, as shown in FIG. 2. As can readily be understood by those skilled in the art, the magnitude of a frictional force exerted by each of the friction pieces 29 on the corresponding carriage 16 or 17 can be varied by turning the associated nut member 26 or 27 to shorten or lengthen the associated compression spring 28.

A length of magnetic recording tape 30 has its opposite ends secured to the hubs 21 on the respective carriages 16 and 17 through transparent leaders (not shown), it being, however, understood that, when the tape cassette TC is in use, rolls of the magnetic recording tape 30 are formed on the respective hubs 21 with the magnetic recording tape 30 running from one roll to the other. In view of this, for ease of explanation, the roll of magnetic recording tape formed on the hub 21 carried by the carriage 16 and that formed on the hub 21 carried by the carriage 17 will hereinafter be referred to as supply and take-up rolls, respectively, with reference characters SR and TR employed therefor, bearing it in mind that, since the direction of transportation of the magnetic recording tape 30 may be reversed, the "supply" and "take-up" rolls shown respectively by SR and TR in FIGS. 1 and 4 may become the "take-up" and "supply" rolls, respectively. It is also to be noted that, when the tape cassette TC is in use, the diameter of the take-up roll TR gradually increases with gradual decrease of the diameter of the supply roll SR as the magnetic recording tape 30 is transported from the supply roll SR onto the take-up roll TR.

The carriages 16 and 17 are normally biased to pivot in directions towards each other by the action of a biasing spring 31 having its opposite ends connected to arm extensions 19a which are integrally formed with, or otherwise rigidly connected to the arms 19 of the respective carriages 16 and 17, said biasing spring 31 extending adjacent to and in parallel relation to the side wall 13 so far illustrated.

Figure 3:
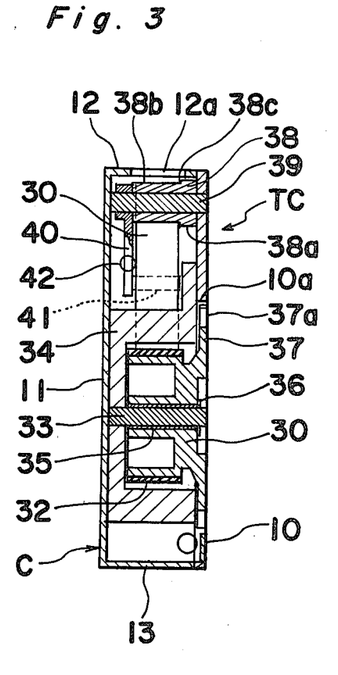

Positioned intermediately of the length of the cassette TC as measured from one end wall 14 to the other end wall 15 and rotatably supported by the base wall 10 in a manner as will be described later is a capstan 32. This capstan 32 is rotatably mounted on a bearing shaft 33 as best shown in FIG. 3, said bearing shaft 33 having one end rigidly connected to a generally U-shaped bracket 34. The bracket 34 is rigidly secured to the base wall 10 by means of a plurality of set screws (not shown) in such a manner as to permit the bearing shaft 33 to extend from the bracket 34 in a direction thicknesswise of the tape cassette TC and at right angles to the base wall 10, the free end of the bearing shaft 33 terminating in the circular opening 10a defined in the base wall 10. As best shown in FIG. 3, the capstan 32 is preferably mounted on the bearing shaft 33 by means of a bearing sleeve 35 effective to facilitate a smooth rotation of the capstan 32 around the bearing shaft 33. The capstan 32 so mounted on the bearing shaft 33 is non-detachably held in position on the bearing shaft 33 by means of a stop member in the form of a split ring which is engaged at 36 on the bearing shaft 36 in an axially non-movable fashion.

As best shown in FIGS. 1, 3, 4, 7 and 9, one axial end of the capstan 32 adjacent the opening 10a in the base wall 10 has a circumferentially perforated coupling disc 37 formed integrally therewith and extending radially outwardly therefrom, said coupling disc 37 being situated within the opening 10a in the base wall 10 with an outer annular face of said coupling disc 37 opposite to the capstan 32 being held in flush with an outer surface of the base wall 10. This coupling disc 37 has a plurality of trios of coupling holes 37a defined therein in a circumferential direction and spaced an equal distance from the longitudinal axis of the bearing shaft 33, each trio of the coupling holes 37a being spaced 120° from each other about the longitudinal axis of the bearing shaft 33. The function of the coupling disc 37 will be described later in connection with a tape transport mechanism TM shown in FIGS. 8, 10 and 11.

The capstan 32 has its outer peripheral face provided with a frictional lining 32a which may be in the form of one or a plurality of tires made of synthetic or natural rubber material and is held in contact with the supply roll SR of magnetic recording tape on the one hand and with the take-up roll TR of magnetic recording tape on the other hand. More specificaly, in an assembled condition of the tape cassette TC shown in FIGS. 1 and 4, since the carriages 16 and 17 are biased by the biasing spring 31 so as to pivot clockwise and counterclockwise about the respective bearing pins 24 and 25, respectively, the supply roll SR and the take-up roll TR are forced to contact the capstan 32 from opposite directions. It is to be noted that, so long as the tape cassette TC is not in use and, therefore, the magnetic recording tape 30 is not running, the contact pressure exerted between the supply roll SR and the capstan 32 is substantially equal to that between the take-up roll TR and the capstan 32.

Figures 7, 8:
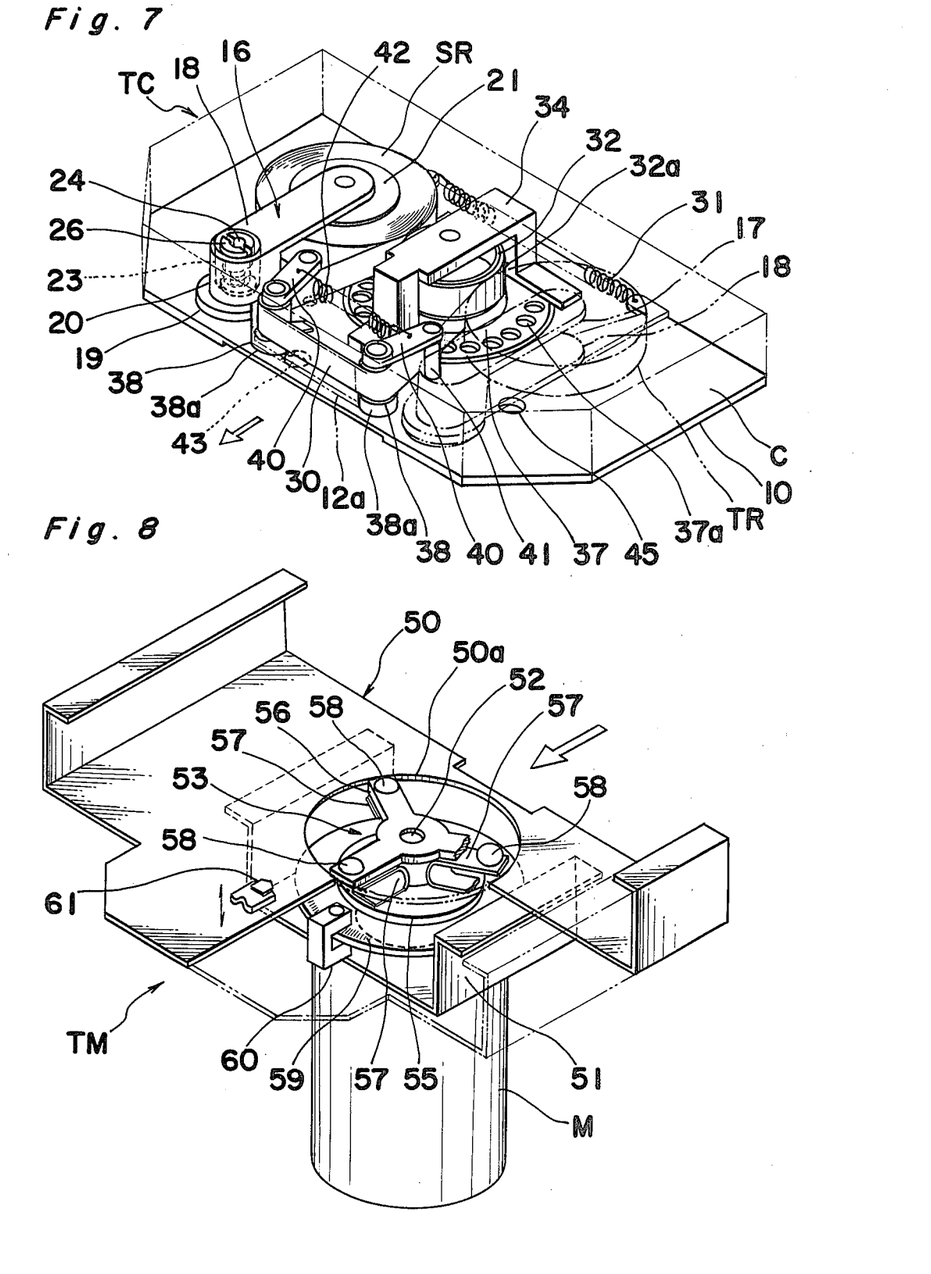
FIG. 7 is a perspective view, with a top wall removed away, of the cassette shown in FIG. 1.
FIG. 8 is a perspective view of a tape transport mechanism embodying the present invention and operable with the cassette shown in FIG. 1.
Figure 9:
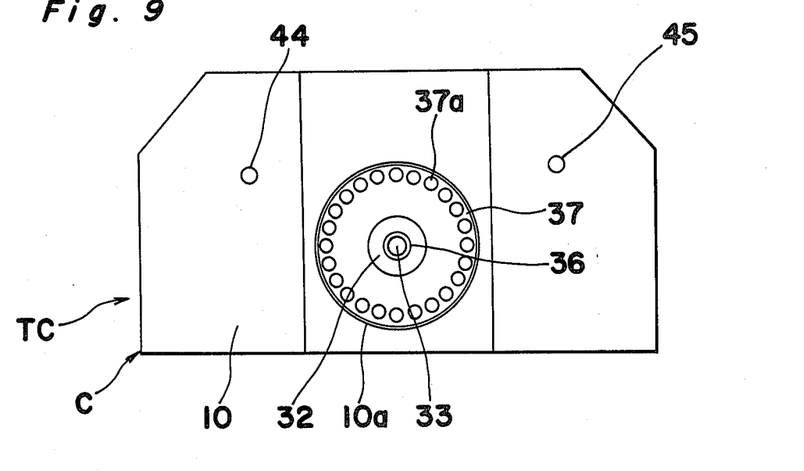
FIG. 9 is a bottom plan view, on a somewhat reduced scale, of the cassette shown in FIG. 1.

A length of magnetic recording tape 30 between the supply and take-up rolls SR and TR extends from the supply roll SR to the take-up roll TR after having turned around a pair of spaced guide sleeves, generally identified by 38, which are rotatably mounted on respective support pins 39 secured rigidly at one end to the base wall 10 on respective sides of the capstan 32 and adjacent the side wall 12. Specifically, the support pins 39 supporting the guide sleeves 38 are so positioned that a portion of the magnetic recording tape 30 extending between the guide sleeves 38 can be exposed to the outside of the container C through a rectangular window 12a defined in the side wall 12, said window 12a being provided for the purpose of permitting any known recording and/or reproducing transducer head to engage the magnetic recording tape 30 therethrough for the reproduction or recording of video information from or on the magnetic recording tape 30. As best shown in FIGS. 3 and 7, each of the guide sleeves 38 is constituted by an enlarged diameter portion 38a and a reduced diameter portion 38b with an annular land 38c defined between the enlarged and reduced diameter portions 38a and 38b and is rotatably mounted on the corresponding support pin 39 with the enlarged diameter portion 38a positioned adjacent the base wall 10. The annular land 38c in each of the guide sleeves 38 is adapted to support one side edge of the magnetic recording tape 30 in level with the plane of one end of each roll SR or TR of magnetic recording tape adjacent the base wall 10 during the running of the magnetic recording tape from the supply roll SR to the take-up roll TR.

In order to keep the length of magnetic recording tape extending between the supply and take-up rolls SR and TR around the guide sleeves 38 taut during the running of the tape from the supply roll SR onto the take-up roll TR, the tape cassette TS is provided with a tensioning device. This tensioning device comprises, as best shown in FIGS. 1, 3, 6 and 7, pivotable levers 40 rigidly mounted on the free ends of the respective support pins 39 and protruding in a direction away from the side wall 12 at right angles to the respective support pins 39. The free ends of said pivotable levers 40 remote from the support pins 39 carry respective tensioning pins 41 each extending from the corresponding pivotable lever 40 in a direction towards the base wall 10.

The tensioning device further comprises a tension spring 42 having its opposite ends so connected to the respective pivotable levers 40 that the pivotable levers 40 are normally biased to pivot clockwise and counterclockwise about the respective support pins 39 with the tensioning pins 41 drawn towards each other as shown by the broken lines in FIG. 1.

While the tensioning device is constructed as hereinabove described, it operates in such a manner as to draw portions of the magnetic recording tape 30 between the supply roll SR and the guide sleeve 38 adjacent the supply roll SR and between the take-up roll TR and the guide sleeve 38 adjacent the take-up roll TR in a direction towards each other thereby holding the magnetic recording tape 30 under tension during the running of the magnetic recording tape 30 from the supply roll SR onto the take-up roll TR.

Figure 6:
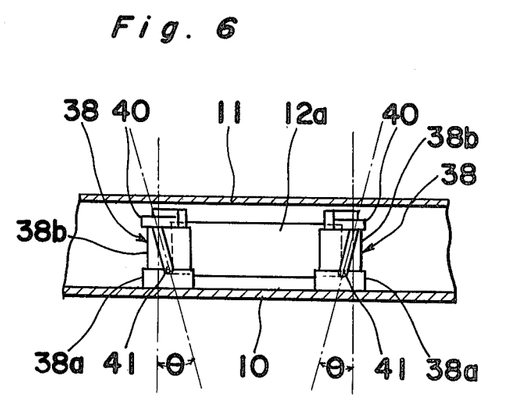
FIG. 6 is a front elevational view showing the arrangement of tensioning pins relative to guide pins employed in the cassette shown in FIG. 1.

In order to ensure that the magnetic recording tape 30 can run steadily along a path between the guide sleeves 38 with one side edge of said tape 30 firmly supported by the annular lands 38c in the respective guide sleeves 38, that is, without permitting the magnetic recording tape 30 to undergo a lateral displacement relative to the transducer head (not shown) engaging said tape 30 through the window 12a, the tensioning pins 41 carried by the respective pivotable levers 40 are preferably inclined at a predetermined angle $\theta$ relative to the plane parallel to the surface of the magnetic recording tape 30 so as to converge towards the base wall 10 as best shown in FIG. 6, although the angle $\theta$ shown in FIG. 6 is somewhat exagerated.

It is to be noted that the guide sleeves 38 may be fixed to, or otherwise formed integrally with, the corresponding support pins 39. In this case, since the guide sleeves 38 do not rotate in contact with the magnetic recording tape 30 being transported, a layer of air cushion is formed between the magnetic recording tape 30 and the outer peripheral surface of the reduced diameter portion 38b of each of the guide sleeves 38 to facilitate a smooth turning movement of the magnetic recording tape 30 past the respective guide sleeve 38. This is particularly true where the magnetic recording tape 30 is transported at a high speed.

Figure 4:
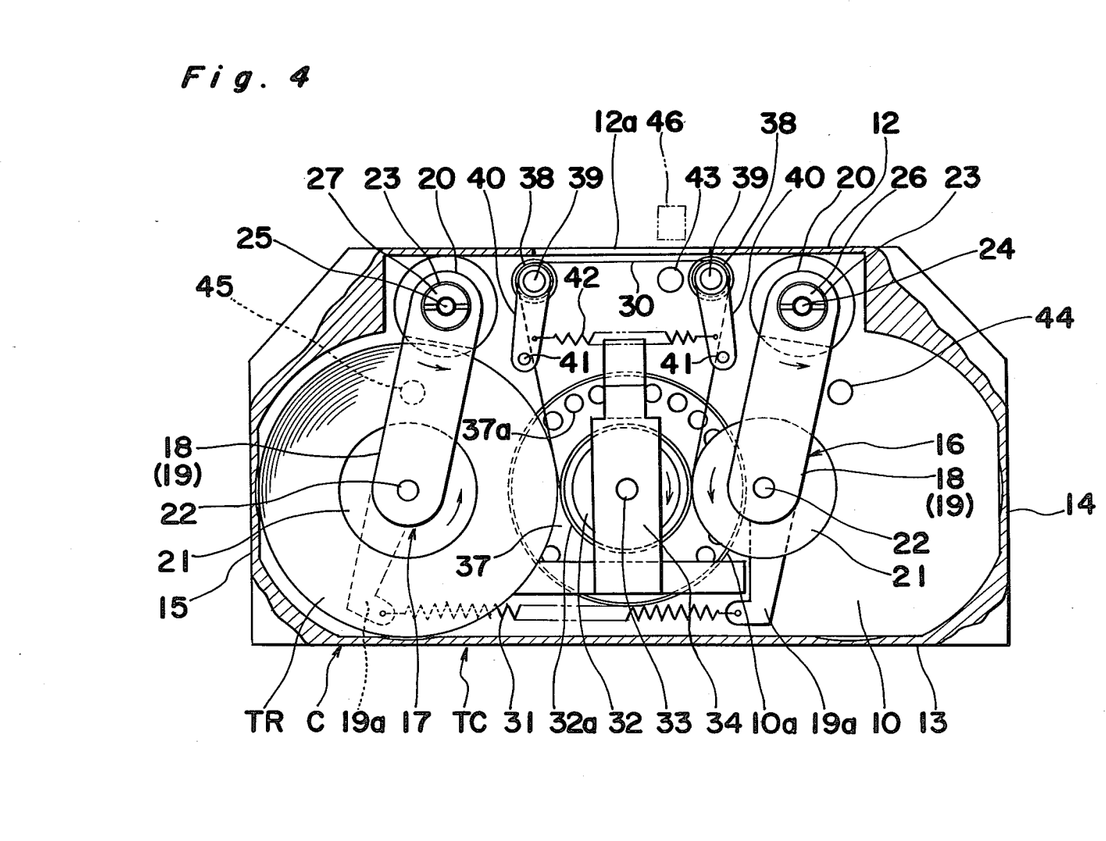
FIG. 4 is a view similar to FIG. 1, showing carriages held in positions different from that shown in FIG. 1.
Figure 5:
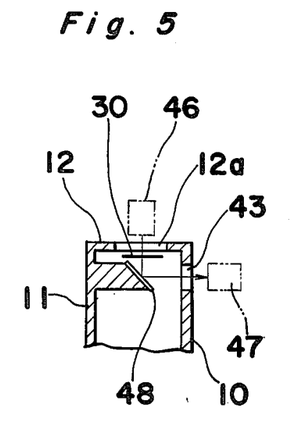
FIG. 5 is a cross sectional view of a portion of the cassette, taken along the line V—V in FIG. 1.

In FIGS. 1 and 4, reference numerals 43, 44 and 45 represents monitoring windows all defined in the base walls 10 and provided in association with photoelectric detector systems (not shown). Specifically, the monitoring window 43 is provided for the passage of rays of light emitted from a light source 46 installed on the tape transport mechanism TM for the detection of either one of the opposite ends of the magnetic recording tape 30. As best shown in FIG. 5, when the magnetic recording tape 30 is completely wound from the supply roll SR onto the take-up roll TR, the light rays from the light source 46 entering the container C through a portion of the window 12a in the side wall 12 pass through the transparent leader and onto a photoelectric detector 47 through the window 43 after having been reflected by a reflective element 48 supported by the upper wall 11 of the container C.

The windows 44 and 45 are provided for a similar purpose to that of the window 43, it being to be understood that rays of light emitted from respective light sources (not shown) and entering the container C through the associated windows 44 and 45 are adapted to be reflected from the arms 19 of each of the carriages 16 and 17 back towards corresponding photoelectric detectors (not shown) through the associated windows 44 and 45. The presence and absence of the reflected light rays from the arms 19 provides an indication of the direction of transportation of the magnetic recording tape 30 and, therefore, the photoelectric detector systems associated with these windows 43, 44 and 45 may be incorporated in any suitable electric circuitry so designed as to effect the reversal of the direction of transportation of the magnetic recording tape in response to the detection of the alignment of the transparent leader with the window 12a. However, since this electric circuitry does not constitute a subject matter of the present invention, the details thereof will not be discussed.

While the tape cassette TC embodying the present invention is constructed in the manner as hereinbefore described, it operated in the following manner.

Assuming that the magnetic recording tape 30 forms a supply roll SR on the hub 21 carried by the carriage 16 with the outer end thereof secured to the hub 21 carried by the carriage 17, a substantially intermediate portion of the tape 30 between the roll SR and the hub 21 on the carriage 17 extending in the manner as shown in FIG. 1, and assuming that the capstan 32 is coupled to a drive unit of the tape transport mechanism TM as will be described later, energization of the drive unit results in the winding-up of the tape 30 from the supply roll SR onto the hub 21 on the carriage 17, forming a take-up roll TR on the hub 21 on the carriage 17. This is possible because the capstan 32 being rotated is held in contact with the hub 21 on the carriage 17, that is, the subsequently formed take-up roll TR, and also with the supply roll SR and the rotation of the capstan 32 is therefore transmitted to the supply roll SR to unwind the tape 30 and also to the take-up roll TR to wind the tape 30.

As the diameter of the take-up roll TR on the hub 21 on the carriage 17 increases with corresponding decrease of the diameter of the supply roll SR, the carriages 16 and 17 pivot clockwise about the associated bearing pins 24 and 25 as viewed in FIG. 1. However, immediately after the start of the pivotal movement of the carriages 16 and 17, frictional force acts on the carriages 16 and 17, respectively, to resist against the pivotal movement of the carriages 16 and 17 because of the employment of the associated friction pieces 29. By this reason, a pressure differential is generated between the pressure of contact of the supply roll SR to the capstan 32 and the pressure of contact of the take-up roll TR to the capstan 32, and the take-up roll TR is pressed against the capstan 32 with a greater pressure than the contact pressure between the supply roll SR and the capstan 32.

The same applies even when the magnetic recording tape 30 is transported from the hub 21 on the carriage 17 onto the hub 21 on the carriage 16 as shown in FIG. 4, with the capstan 32 being rotated in a direction reversed to that shown in FIG. 4.

It is to be noted that, when the frictional forces act on the carriages 16 and 17 to resist against the pivotal movement of the carriages 16 and 17 in the manner as hereinabove described, the supply roll SR tends to separate from the contact with the capstan 32. However, this possibility does not actually occur because the biasing spring 31 is so selected as to exert a pulling force sufficient to overcome the resistance acting on any one of the carriages 16 and 17.

The tensioning device is operable to absorb a slackening of the magnetic recording tape 30 which would occur, for example, when the direction of transportation thereof is reversed. Specifically, when the direction of transportation of the magnetic recording tape 30 is reversed, not only does the temporary slackening of the tape 30 occur, but also the set up of the pressure differential between the pressure of contact of the take-up roll TR to the capstan 32 and the pressure of contact of the supply roll SR to the capstan 32 may be delayed. This tends to result in misalignment of the magnetic recording tape 30 relative to the transducer head. However, this possibility can be avoided by the employment of the tensioning device of the construction as hereinbefore described.

Hereinafter, the tape transport mechanism TM operable with the tape cassette TC of the construction hereinbefore described will be described with particular reference to FIGS. 8, 10 and 11.

Figures 10, 11:
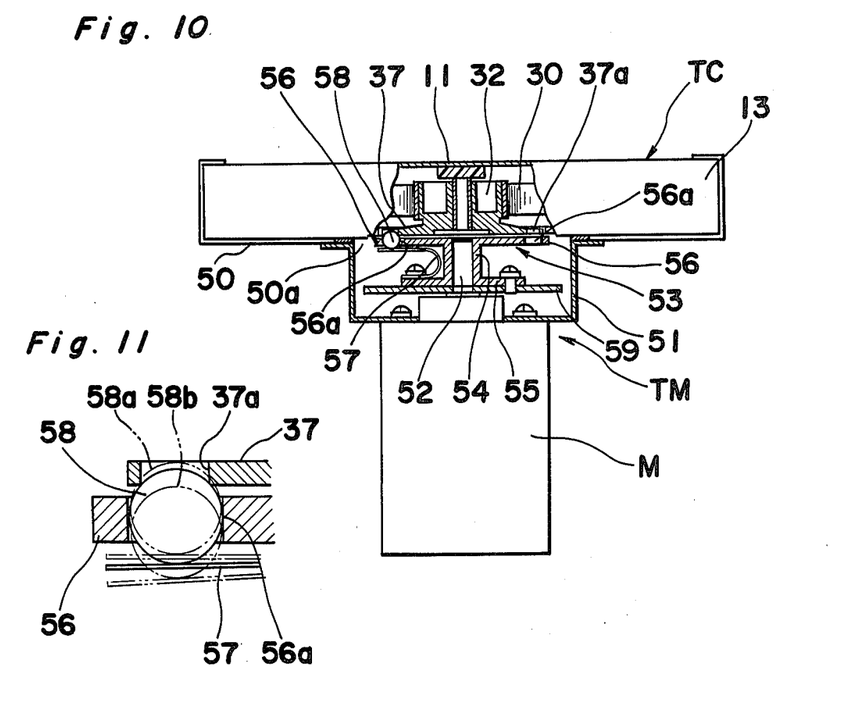
FIG. 10 is a side sectional view, with a portion broken away, of the tape transport mechanism with the cassette loaded thereon.
FIG. 11 is a sectional view, on an enlarged scale, of one of elements forming a coupling device provided on the tape transport mechanism.

Referring now to FIGS. 8, 10 and 11, the tape transport mechanism TM comprises a cassette holder 50 having its opposite sides so bent as to guide and hold the opposite end portions of the tape cassette C when the latter is inserted into and accommodated in position within the cassette holder 50. This holder 50 has a circular opening 50a defined therein at a position where, when the tape cassette TC is accommodated in the holder 50, the opening 10a in the base wall 10 in the tape cassette TC can be aligned with the opening 50a in the holder 50. Secured to the undersurface of the cassette holder 50 is a spacer bracket 51 carrying an electric reversible drive motor M positioned externally of the spacer bracket 51 with respect to the cassette holder 50 and having a drive shaft 52. The drive shaft 52 of the drive motor M so supported in the manner as hereinabove described extends in coaxial relation to the opening 50a in the cassette holder 50 in a direction upwardly, as viewed in FIG. 10, towards the cassette holder 50 and terminating at a position spaced a slight distance from the bottom of the cassette holder 50.

The tape transport mechanism TM further comprises a rotary coupler 53 rigidly mounted on the drive shaft 52 for rotation together therewith. This rotary coupler 53 comprises a cylindrical hollow body 54 having one end formed with a radially outwardly extending flange 55 and the other end formed with circumferentially equally spaced and radially outwardly extending coupling arms 56, each of said coupling arms 56 having a bearing hole 56a defined therein adjacent the free end thereof. This rotary coupler 53 also comprises generally U-shaped leaf springs 57 equal in number to the number of the coupling arms 56 and also to the number of the coupling holes 37a forming each trio in the coupling disc 37 in the tape cassette TC.

The leaf springs 57 are rigidly secured at one end to the radially outwardly extending flange 55 of the rotary coupler 53, the other end portions of the respective leaf springs 57 terminating at a position spaced a slight distance from the corresponding arms 56 and traversing the bearing holes 56a in the corresponding arms 56. Positioned within the bearing holes 56a in the coupling arms 56 and supported from bottom by the leaf springs 57 are coupling balls 58 detachably engageable in the bearing holes 37a in the coupling disc 37 in a manner as will subsequently be described. As best shown in FIG. 11, each of the coupling balls 58, so supported, protrudes partially beyond the corresponding coupling arm 56 in a direction opposite to the leaf spring 57 and normally assumes a position shown by the chain line 58a as biased by the corresponding leaf spring 57.

Referring still to FIG. 11, when the tape cassette TC is inserted into the cassette holder 50 in a direction shown by the arrow in FIG. 8, each of the coupling balls 58 is first downwardly depressed against the corresponding leaf spring 57 to assume a position shown by the chain line 58b in contact with the coupling disc 37 in the tape cassette TC being inserted and is then biased upwardly by the action of the corresponding leaf spring 57 to assume a position shown by the solid line with a portion thereof firmly engaged into the corresponding bearing hole 37a in the coupling disc 37, thereby completing the coupling of the motor drive shaft 52 to the capstan 32 inside the tape cassette TC. When the tape cassette TC which has been inserted into the cassette holder 50 is to be removed out from the cassette holder 50, each of the coupling balls 58 behaves in a manner substantially reverse to that described above.

It is to be noted that, if desired for the purpose of avoiding any possible separation of the coupling balls 58 out from the corresponding bearing holes 56a in the coupling arms 58, the coupling balls 58 may be rigidly secured to, or otherwise welded or bonded to, the respective leaf springs 57. Alternatively, each of the bearing holes 56a in the respective coupling arms 58 may be so tapered as to avoid this possibility, or a pin member having one end rounded and the other end rigidly secured to the respective leaf spring 57 may be employed in stead of each of the coupling balls 58.

From the foregoing, it is clear that, when and after the tape cassette TC is completely inserted into the cassette holder 50 in the manner described above, the capstan 32 inside the tape cassette TC can readily be coupled to the drive shaft 52 of the drive motor M through the rotary coupler 53 of the construction described above. So long as the coupling balls 58 are partially engaged into the coupling holes 37a in the coupling disc 37 fast with the capstan 32, a rotational force of the drive shaft 52 can be transmitted to the capstan 32 to rotate the latter.

Reference numeral 59 shown in FIGS. 8 and 10 represents a stroboscopic disc coaxially secured to the flange 55 of the rotary coupler 53 for rotation together therewith, said stroboscopic disc 59 being operable in association with a photoelectric detector 60 for detecting variation in speed of rotation of the drive shaft 52 to generate a control signal necessary to maintain the rotational speed of the drive shaft 52 at a constant value. In FIG. 8, the magnetic recording and/or reproducing transducer head referred to in the description of the details of the tape cassette TC is shown by 61. Where the magnetic recording tape 30 used is of a type having a plurality of recording tracks, the transducer head 61 may be of a type either supported for selective movement in a direction perpendicular to the lengthwise direction of the tape 30 or composed of a plurality of selectively operable head components arranged one above the other in a direction perpendicular to the lengthwise direction of the tape 30.

From the foregoing full description of the present invention, it has now become clear that the present invention involves the following advantages.

By suitably selecting the angle $\theta$ of inclination of each of the tensioning pins 41, not only can the steady running of the magnetic recording tape 30 past the guide sleeves 38 be achieved in cooperation with the enlarged diameter portions 38a, but also recording or reproduction of video information on or from relatively finely divided tracks on the tape 30 can be achieved.

In addition, since the pressure differential generating means is constituted by the friction pieces 29 which are mounted on the support pins 24 and 25 and sandwiched between the arms 19 in the respective carriages 16 and 17 and the base wall 10 of the container C, no large space for installation thereof such as required in the prior art device is required and the tape cassette can be advantageously manufactured at a minimized cost.

Moreover, since the capstan 32 is incorporated in the tape cassette TC and is constantly held in contact with the supply and take-up rolls SR and TR by the action of the biasing spring 31, there is no possibility that the magnetic recording tape 30 may be arbitrarily slackened when the tape cassette TC is not use. In the event that any possible slackening of the tape 30 should occur, the slackening of the tape 30 can be absorbed by the tensioning device which is also incorporated in the tape cassette TC together with the capstan 32.

The employment of the tensioning device is additionally advantageous in that the direction of transportation of the magnetic recording tape 30 can be changed only by reversing the direction of rotation of the capstan 32 with a possible slackening of the tape absorbed readily thereby.

Furthermore, since the coupling system necessary to couple the drive shaft of the motor to the capstan is simple in construction and reliable in performance, the video tape recorder incorporating the tape transport mechanism according to the present invention can be manufactured in a compact size suited for domestic use.

While the preferred embodiment of the present invention is such as hereinbefore fully discussed with reference to the accompanying drawings, it is to be noted that various changes and modifications are apparent to those skilled in the art. By way of example, the number of the coupling arms 56 of the rotary coupler 53 may not be limited to three such as shown and described, but it may be two or more. Simultaneously therewith or independently thereof, either a pair of, or a plurality of pairs of, bearing holes may be employed instead of the plurality of trios of bearing holes 37a in the coupling disc 37. However, the arrangement wherein the three coupling balls 58 are employed in equally spaced relation to each other with respect to the longitudinal axis of the drive shaft 52 is advantageous in that the amount of torque imposed on the motor drive shaft 52 through each coupling ball 58 can be minimized as compared with that afforded by the employment of one or two coupling balls 58. The use of the plurality of trios of bearing holes 37a in the coupling disc 37 advantageously facilitates a ready and quick coupling of the capstan 32 to the motor drive shaft 52.

Moreover, although the friction pieces 29 have been described in the form of a ring and have been described as mounted on the bearing pins 24 and 25, they may be either permanent magnet pieces installed on the base wall 10 or solid friction pieces held in contact with the connecting posts 20 in the respective carriage 16 and 17. Where the magnet pieces are employed, an eddy current generated thereby can be utilized to apply a braking force to the pivotal movement of the carriages 16 and 17.

Accordingly, such changes and modifications are to be understood as included within the true scope of the present invention unless they depart therefrom.

I claim:

1. A tape cassette construction which comprises, in combination:
   means defining a support wall of a tape cassette having an operating zone on one side of the support wall;
   first and second spaced carriages supported in said operating zone by the support wall for pivotal movement;
   hubs rotatably carried by said first and second carriages and wrapped with magnetic recording tape to form rolls of tape carried by the first and second carriages, respectively, each of said hubs being positioned on the corresponding carriage at a point spaced from the point of pivot of the corresponding carriage;
   a drive wheel rotatably supported in the operating zone by the support wall and including a coupling means coaxial therewith, said coupling means being adapted to receive a rotational force necessary to rotate the drive wheel;
   a biasing means for biasing the first and second carriages in a direction towards each other with said rolls on the hubs held in contact with said drive wheel from opposite directions;
   a friction element for each of the first and second carriages operatively mounted to impart a resistance to movement of the corresponding carriage in a direction counter to the direction of pivotal movement of the corresponding carriage;
   said friction element comprising a ring-shaped friction piece sandwiched between the corresponding carriage and the support wall and encircling the axis of pivot of the corresponding carriage;
   at least one pair of guide poles supported in the operating zone by the support wall for guiding a portion of the magnetic recording tape between the rolls along a predetermined path;
   a tensioning device positioned in the operating zone for absorbing any possible slackening of the magnetic recording tape;
   said tensioning device comprising a pair of pivotable levers, each lever being rotatably mounted on the corresponding guide pole at right angles thereto and having a tensioning pin carried thereby at the other end thereof, said tensioning pin extending from a corresponding pivotable lever in a direction generally perpendicular to the corresponding pivotable lever and towards the support wall, and
   a biasing element for biasing said pivotable levers in a direction towards each other.

2. A construction as claimed in claim 1, wherein said tensioning pins are inwardly inclined relative to the longitudinal extent of any one of the guide poles so as to converge towards the support wall.

3. A construction as claimed in claim 1, or 2, wherein the support wall has an opening defined therein and wherein said coupling means comprises a coupling disc positioned in said opening in the support wall and exposed to the other side of the operating zone, said coupling disc having a plurality of perforations defined therein in equally spaced relation to each other and also to the axis of rotation of the drive wheel.

4. In combination, a tape cassette and a tape transport mechanism,
   said tape cassette comprising:
   means defining a support wall having an operating zone on one side thereof;
   first and second spaced carriages supported in the operating zone by the support wall for pivotal movement;
   hubs rotatably carried by the first and second carriages and wrapped with magnetic recording tape to form rolls of tape carried by the first and second carriages, respectively, each of said hubs being positioned on the corresponding carriage at a point spaced from the point of pivot of the corresponding carriage;
   drive wheel rotatably supported in the operating zone by the support wall and including a coupling means coaxial therewith, said coupling means being adapted to receive a rotational force necessary to rotate the drive wheel;

a biasing means for biasing the first and second carriages in a direction towards each other with said rolls on the hubs held in contact with said drive wheel from opposite directions;

a friction element for each of the first and second carriages and operable to impart a resistance to the movement of the corresponding carriage in a direction counter to the direction of pivotal movement of the corresponding carriage, said friction element comprising a ring-shaped friction piece sandwiched between the corresponding carriage and the support wall and encircling the axis of pivot of the corresponding carriage, at least one pair of guide poles supported in the operating zone by the support wall for guiding a portion of the magnetic recording tape between the rolls along a predetermined path;

a tensioning device positioned in the operating zone for absorbing any possible slackening of the magnetic recording tape, said tensioning device comprising a pair of pivotable levers, each lever rotatably mounted on the corresponding guide pole at right angles thereto and having a tensioning pin carried thereby at the other end thereof, said tensioning pin extending from the corresponding pivotable lever in a direction generally perpendicular to the corresponding pivotable lever and towards the support wall; and a biasing element for biasing the pivotable levers in a direction towards each other;

and wherein said tape transport mechanism comprises:

means having a base plate for holding said tape cassette in position; and an electric reversible drive unit including a drive coupling means connectable with the coupling means in the tape cassette automatically when the tape cassette is held in position on the base plate to provide said rotational force necessary to rotate the drive wheel.

5. A combination as claimed in claim 4, wherein the support wall has an opening defined therein, and said coupling means in the tape cassette comprises a coupling disc positioned in said opening in the support wall and exposed to the other side of the operating zone, said coupling disc having a plurality of perforations defined therein in equally spaced relation to each other and also to the axis of rotation of the drive wheel, and wherein said base plate has an opening defined therein and said drive coupling means comprises a rotary coupler adapted to be driven by the drive unit and having at least one pair of oppositely extending support arms, and collapsible coupling elements carried by the respective arms, said coupling elements when the tape cassette is held in position on the base plate with the coupling means in the tape cassette aligned with the rotary coupler, partially engaging in any two of the perforations in the coupling disc which are opposite to each other.

* * * * *